United States Patent [19]

Oh

[11] Patent Number: 5,694,181
[45] Date of Patent: Dec. 2, 1997

[54] DIGITAL CONVERGENCE CORRECTING CIRCUIT

[75] Inventor: Chae Gon Oh, Suwon, Rep. of Korea

[73] Assignee: Samsung Electronics Co., Ltd., Kyungki-do, Rep. of Korea

[21] Appl. No.: 172,257

[22] Filed: Dec. 23, 1993

[30] Foreign Application Priority Data

Jul. 30, 1993 [KR] Rep. of Korea ............... 93-14672

[51] Int. Cl.$^6$ ............................................. H04N 9/28
[52] U.S. Cl. ............... 348/807; 348/806; 315/368.13; 315/368.12
[58] Field of Search ........................... 348/745, 746, 348/806, 807, 747; 315/368.12, 368.13, 368.11; H04N 9/28

[56] References Cited

U.S. PATENT DOCUMENTS

| | | | |
|---|---|---|---|
| 4,672,275 | 6/1987 | Ando | 348/745 |
| 4,673,847 | 6/1987 | Louie et al. | 348/807 |
| 4,816,908 | 3/1989 | Colineau et al. | 348/747 |
| 5,111,284 | 5/1992 | Tsujihara et al. | 348/747 |
| 5,216,497 | 6/1993 | Tsujihara et al. | 348/745 |
| 5,345,280 | 9/1994 | Kimura et al. | 348/745 |

*Primary Examiner*—Michael H. Lee
*Attorney, Agent, or Firm*—Sughrue,Mion,Zinn,Macpeak & Seas, PLLC

[57] ABSTRACT

A digital convergence correcting circuit for digitally correcting a convergence of R, G and B, which includes a memory for storing only seed data and a convergence correcting part for interpolating and latching the stored seed data with 16 points of sampling data by using a predetermined equation and then interpolating the latched sampling data in a vertical direction with as many horizontal lines as are necessary according to the particular broadcasting system. Since only seed data is stored at the memory, the size of the memory is minimized.

13 Claims, 5 Drawing Sheets

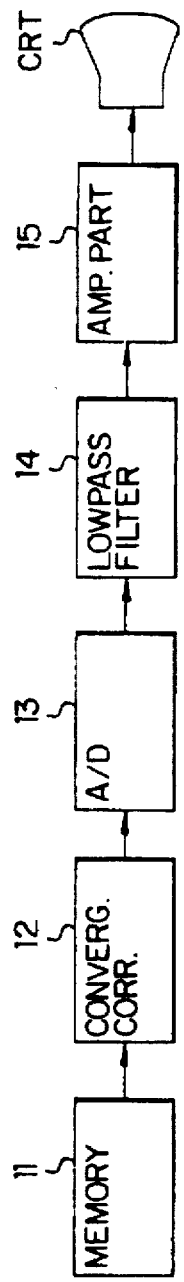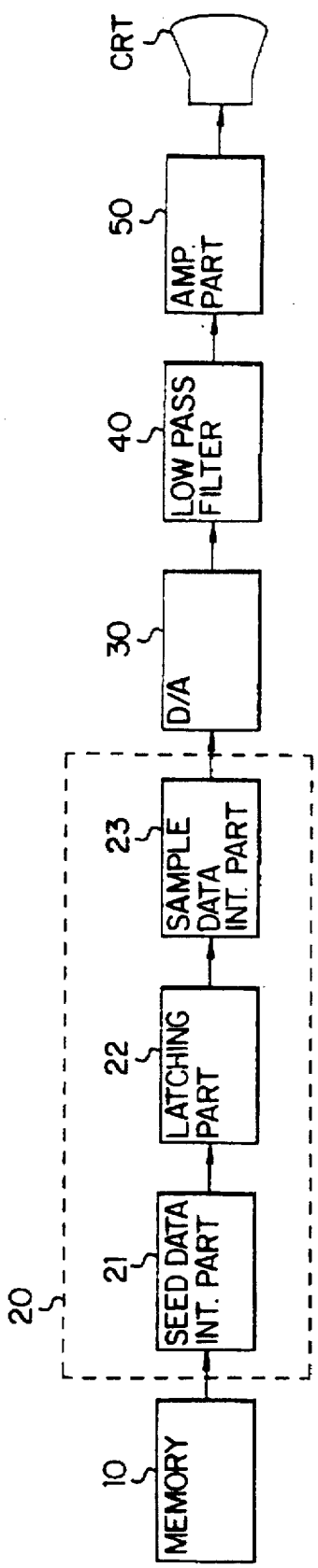

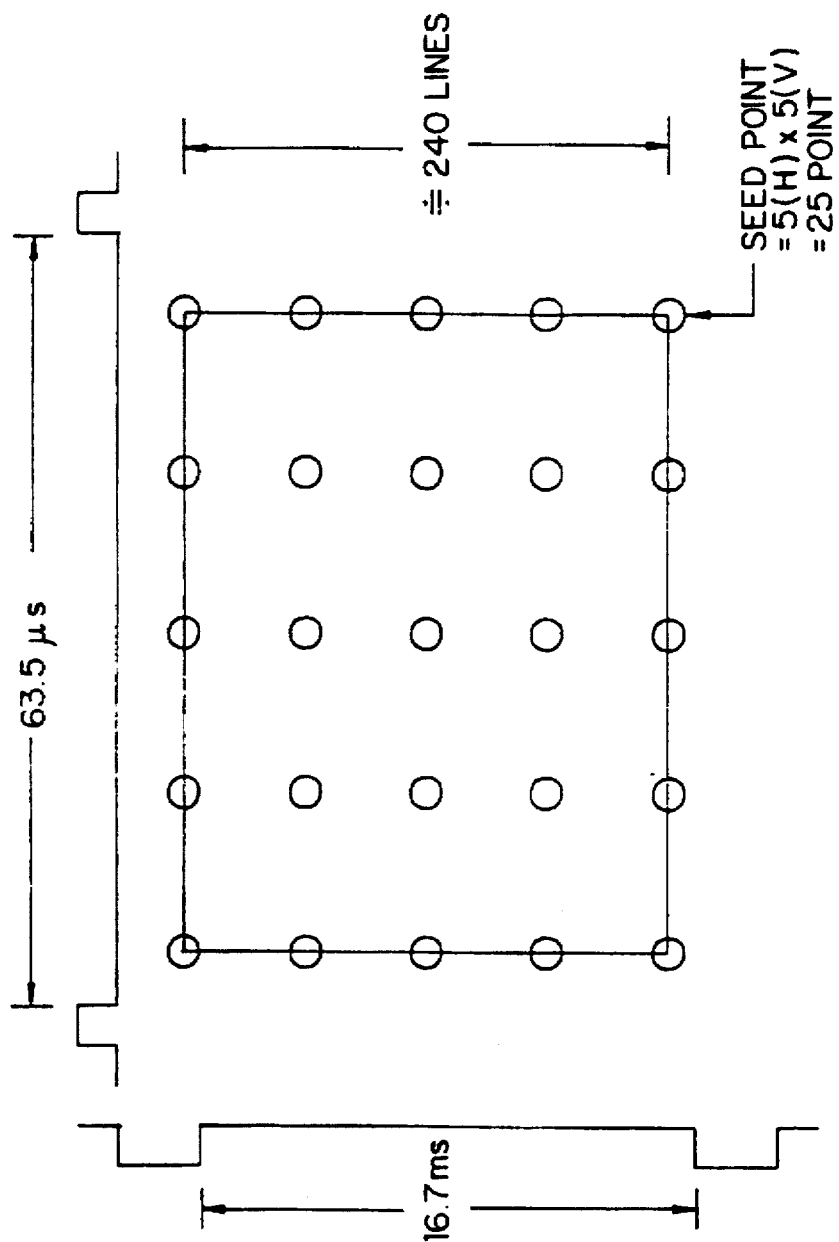

FIG.4A
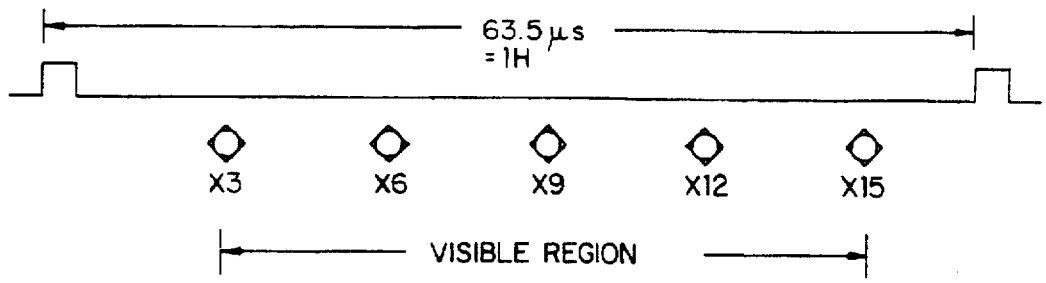
FIG.4B
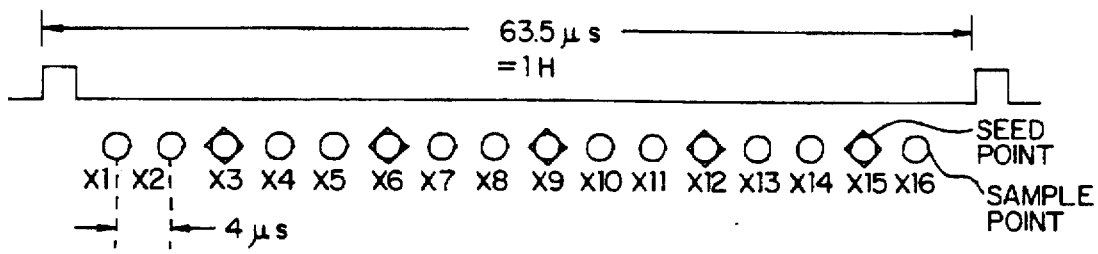
FIG.4C
| 8 | 7 | 6 | 5 | 4 | 3 | 2 | 1 | 0 |   R-H : 9 BIT
| 8 | 7 | 6 | 5 | 4 | 3 | 2 | 1 | 0 |   G-H : 9 BIT
| 8 | 7 | 6 | 5 | 4 | 3 | 2 | 1 | 0 |   B-H : 9 BIT
| 11 | 10 | 9 | 8 | 7 | 6 | 5 | 4 | 3 | 2 | 1 | 0 |   R-V : 12 BIT
| 11 | 10 | 9 | 8 | 7 | 6 | 5 | 4 | 3 | 2 | 1 | 0 |   G-V : 12 BIT
| 11 | 10 | 9 | 8 | 7 | 6 | 5 | 4 | 3 | 2 | 1 | 0 |   B-V : 12 BIT

DIGITAL CONVERGENCE CORRECTING CIRCUIT

FIELD OF THE INVENTION

The present invention relates to a digital convergence correcting circuit in which after storing only seed data into a memory by setting a predetermined point of a screen as a seed point, the seed data is interpolated using a Lagrange equation. The present disclosure is based on the disclosure of Korean Application No. 93-14672 filed Jul. 30, 1993 which disclosure is incorporated herein by reference.

BACKGROUND OF THE INVENTION

Convergence generally defines a phenomenon that the colors of red, green and blue are not in agreement on a screen of a color displaying mechanism, such as a television or a monitor. In particular, the convergence of the colors red, green and blue may be pronounced in a projection television in which a picture is formed by projecting a beam on the screen by using R, G and B CRT's separately. At this time, the generated convergence appears to be a ghost, but in fact it is not a ghost.

As a method for correcting such a convergence, there have been proposed an analog-like method and a digital-like method.

The analog-like method attempts to correct the convergence by varying a volume of a variable resistor or the like. However, the analog-like method requires a considerable amount of time for adjustment, moreover, it is hard to accord the convergence at a corner portion.

On the other hand, the digital-like method attempts to accord the convergence by dividing the picture into several points, with data of each point being indicated as a digital data bit, so that only the R, G and B data of a specified point where the convergence does not coincide are varied. In this case, the digital-like method is referred to as a digital convergence correction, for convenience.

FIG. 1 is a block diagram briefly showing the conventional digital convergence correcting circuit, which comprises a memory 11 for storing data of the whole screen, a convergence correcting part 12 for representing data of each point as a digital data bit by dividing the picture into several points and for according a convergence by varying only R, G and B data at a specified point having a disaccorded convergence, a digital/analog converter 13 for converting an output obtained from the convergence correcting part 12 into an analog signal, a low-pass filter 14 for passing through the converted analog signal having a low band component and an amplifying part 15 for amplifying the output of the low-pass filter 14 so as to display it on a CRT.

In such a construction as shown in FIG. 1, 1H (horizontal period) is usually divided into 16 sampling data points. At this time, as to the division of 1H into 16 sampling data points, a coincidence of R, G and B will have the same effect as if the R, G and B of the entire 1H are accorded. In this case, even though there is a difference, the difference may not be recognized by human eyes, and a suitable difference can be obtained by experiment.

One of the sampling data is divided into a horizontal direction of R, G and B data (R-H, G-H and B-H) and a vertical direction of R, G and B data (R-V, G-V and B-V).

It is assigned 9 bits for R-H, 9 bits for G-H, 10 bits for B-H, 12 bits for R-V, 12 bits for G-V, 12 bits for B-V, respectively, so that 64 bits in total are assigned for a single sampling data. In this respect, the bit values assigned for the horizontal and vertical directions of R, G and B data may be varied.

Since there exist 16 sampling data in 1H, 64 bits×16 (sampling data) (which equals to 1024 bits, and to 1K byte) is assigned for 1H. To the memory 11, data for a single picture is stored, and this data is changed in accordance with a broadcasting system.

That is, provided that the broadcasting system is the NTSC system having 240H lines, 240K byte (1K byte× 240H) is assigned for a single picture for which the memory 11 must use a ROM of 256K byte.

On the other hand, a capacitance of the memory 11 is changed in the case of a PAL broadcasting system. That is, since the PAL broadcasting system has 312H lines, 312K byte (1K byte×312H) is assigned, for which, accordingly, 512K byte of ROM should be used for the memory 11.

The convergence correcting part 12 accords the convergence by searching R, G and B data at specified points where the convergence is disaccorded in the data stored in the memory 11.

For instance, if the data for the third R at 200H line is disaccorded in the horizontal and vertical directions, it is necessary only to correct R. That is, R-H should be 110001111 and R-V should be 000000011000, and in this respect, if R-H is incorrectly in as 110000011 and R-V is incorrectly in as 000000011110, it will be necessary to correct R-H to be 110001111 and R-V to be 000000011000.

Likewise, since only the data bit of the points having disaccorded convergence needs to be corrected, the correction can be accurately made even in the corner portion.

Data for a single screen where the convergence is corrected at the convergence correcting part 12 is converted into analog data by the digital/analog converter 13, and only the low-band frequency portion is filtered at the low-pass filter 14, so as to be input to the amplifying part 15. The amplifying part 15 amplifies the output of the low-pass filter 14 and provides it to the CRT.

As mentioned above, according to the known system of FIG. 1, compared to the analog convergence correcting method, it takes less time to make the adjustment and the correction is possible even at the corner of the screen. Accordingly, the system is capable of obtaining a perfect convergence.

However, the method or system of FIG. 1 has the following problems: Since the data of the entire screen is to be stored, the size requirement for the memory is large and the cost therefor is accordingly increased; since the size for the memory is changed according to the broadcasting system, the number of memories is also changed according to the broadcasting system, that is, if the broadcasting system includes NTSC and PAL systems, two memories (i.e., 265K and 512K) are required; and since the correction of convergence is separately made according to the broadcasting system, the time required for the correction is long.

SUMMARY OF THE INVENTION

An object of the present invention is to provide a digital convergence correcting circuit in which a size of a memory can be reduced by setting a specified point of a screen as seed data and storing the seed data in the memory.

Another object of the present invention is to provide a digital convergence correcting circuit in which convergence correction is possible by the seed data stored at a single memory by using a Lagrange equation regardless of a broadcasting system, so that the time required for the convergence correction can be reduced.

According to the present invention, there is provided a digital convergence correcting circuit for converting a convergence-corrected data into analog data and displaying it on a CRT after low-pass filtering and amplifying the data, comprising: memory means for setting only a predetermined point of picture as seed data and storing only the seed data; convergence correcting means for interpolating and latching the seed data stored at the memory means with a predetermined number of sampling data by using a predetermined equation and interpolating the predetermined number of sampling data by using a predetermined equation and interpolating the predetermined number of latched sampling data in a vertical direction in real time with as many lines as are necessary according to the specific broadcasting system.

BRIEF DESCRIPTION OF THE DRAWINGS

FIG. 1 is a block diagram of a conventional digital convergence correcting circuit.

FIG. 2 is a block diagram of the digital convergence correcting circuit according to an embodiment of the present invention.

FIG. 3 shows seed data displayed in a visible region on a screen in the digital convergence correcting circuit according to the present invention.

FIGS. 4A–4D show an embodiment of the process for interpolating the seed data with 16 points of sampling data in the digital convergence correcting circuit according to the invention.

DETAILED DESCRIPTION OF THE PREFERRED EMBODIMENT

Figure 4D:
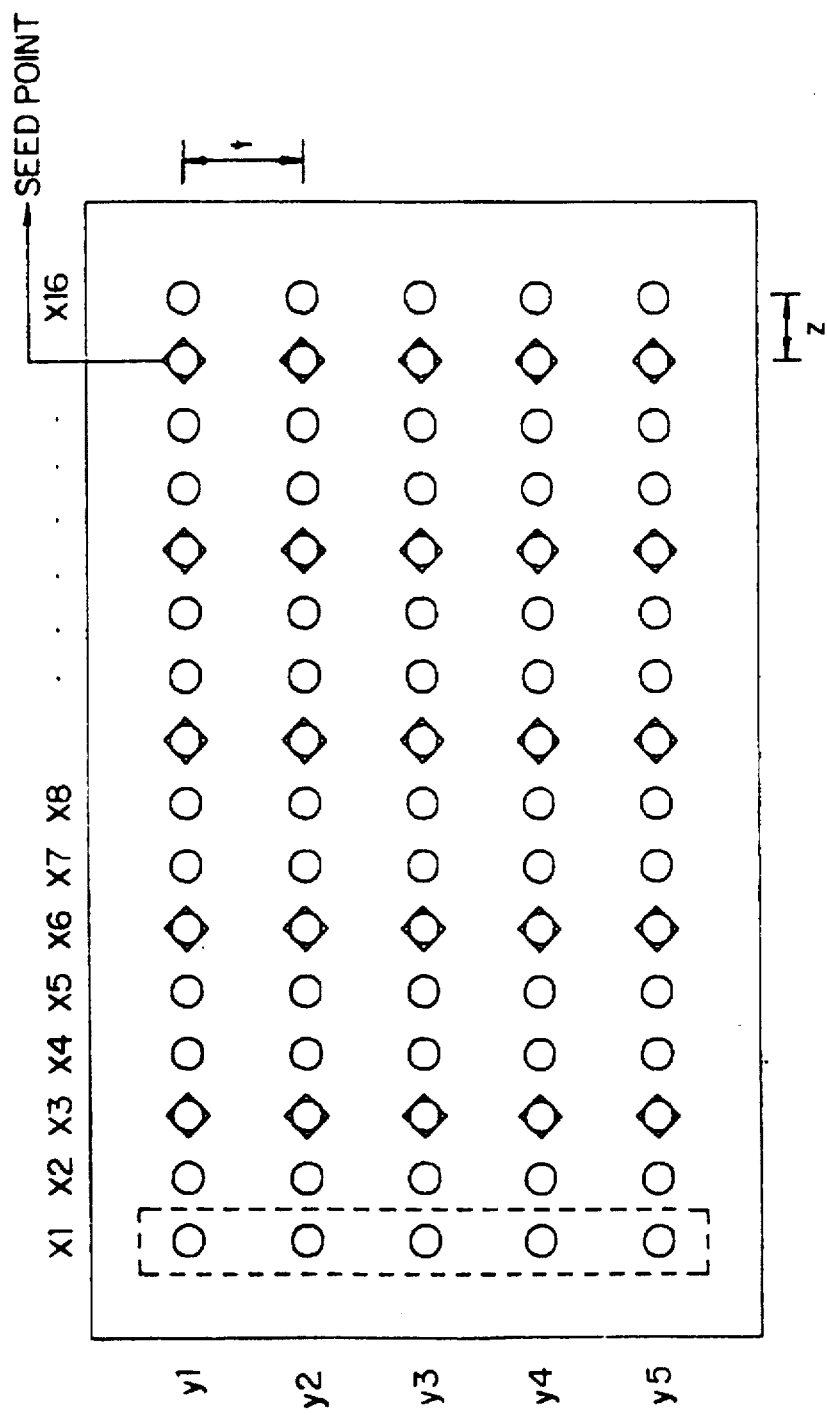

FIG. 2 is a block diagram of the digital convergence correcting circuit according to an embodiment of the present invention.

Referring to FIG. 2, in the memory 10 for storing seed data, 1H is interpolated with 16 sampling data by using Lagrange equation, and a convergence correcting part 20 for correcting a convergence by interpolating data with as many lines as are necessary according to the broadcasting system for a single screen is connected to the memory 10.

A digital/analog converter 30 for converting an output of the convergence correcting part 20 into analog data is connected to the convergence correcting part 20. A low pass filter 40 for passing only the low band components at the output of the digital/analog converter 30 is connected to the digital/analog converter 30, and an amplifying part 50 for amplifying an output of the low-pass filter 40 and displaying it on a CRT is connected to the low-pass filter 40.

The convergence correcting part 20 includes seed data interpolating part 21 for interpolating the seed data stored at the memory 10 with 16 sampling data, latching part 22 for temporarily latching the output of the seed data interpolating part 21, and a sampling data interpolating part 23 for interpolating the output of the latching part 22 in a vertical direction in accordance with the broadcasting system.

FIG. 3 shows a diagram in which specified points of a screen are displayed in a visible region by setting seed data in the case of an NTSC broadcasting system in a digital convergence correcting circuit.

FIG. 4 shows an embodiment of a process for obtaining 16 points of sampling data by using seed data in the digital convergence correcting circuit according to the present invention. Specifically, FIG. 4(A) shows an embodiment of seed data revealed in 1H, and FIG. 4(B) shows an embodiment in which 5 seed data set in 1H are interpolated with 16 points of sampling data. FIG. 4(C) shows an embodiment of the number of bits assigned to a single data, in which 63 bits in total are assigned for a single data by assigning 9 bits for R-H, 9 bits for G-H, 9 bits for B-H, 12 bits for R-V, 12 bits for G-V and 12 bits for B-V, respectively. FIG. 4(D) shows an embodiment in which the seed data of the whole screen is interpolated with a sampling data.

Figure 5A:
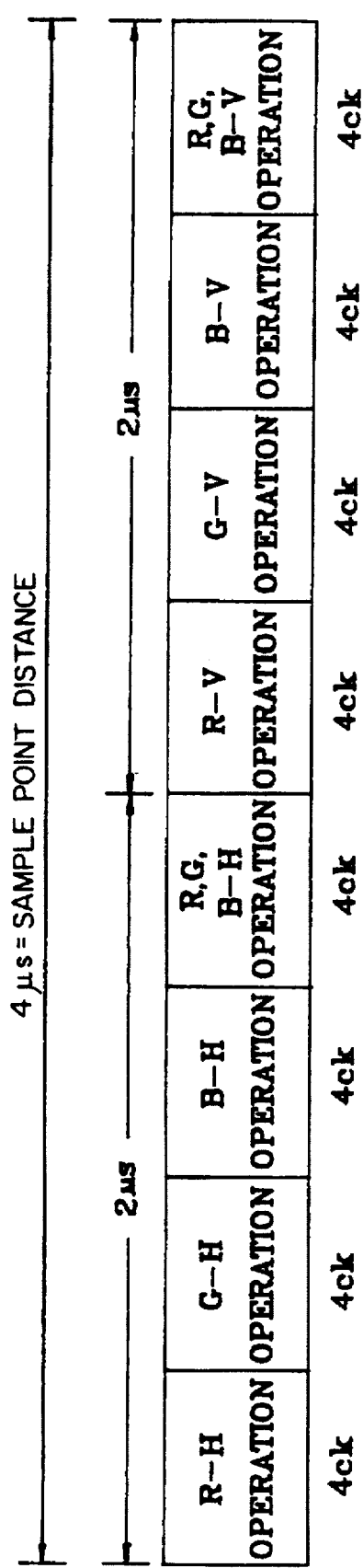
FIG. 5A is an embodiment of the interpolating timing in the digital convergence correcting circuit according to the present invention, and FIG. 5B shoes seed data at the surface of a non-spherical CRT in the digital convergence correcting circuit of the invention.
Figure 5B:
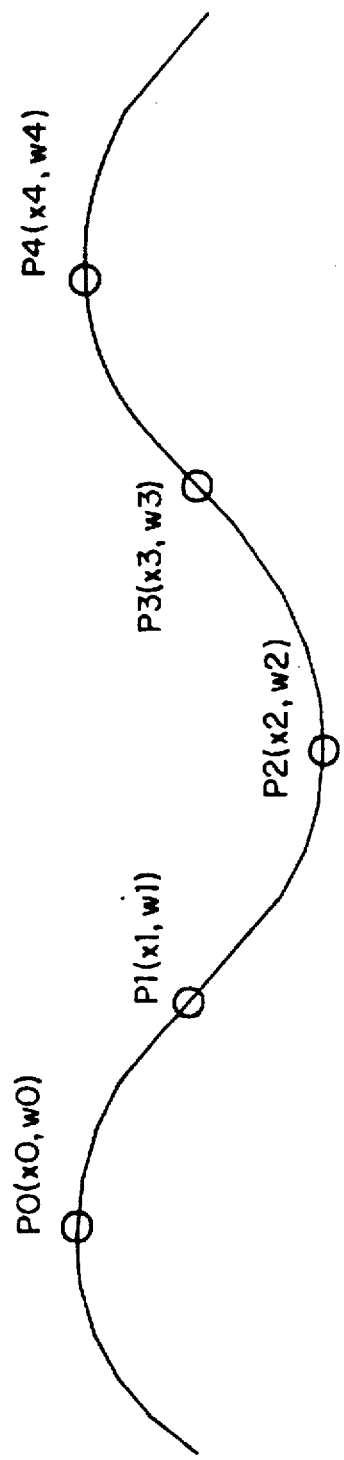

FIG. 5(A) is an embodiment of the interpolating timing in the digital convergence correcting circuit, and FIG. 5(B) shows seed data at the surface of a non-spherical CRT in the digital convergence correcting circuit, according to the present invention.

The operation of the digital convergence correcting circuit shown in FIG. 2 will now be described in detail in conjunction with FIGS. 3–5. In such a construction, 25 points of seed data for a single screen are set in such manner that 5 points in horizontal direction and 5 points in vertical direction are set (see FIG. 3). Accordingly, 5 seed data exist in 1H, as shown in FIG. 4(A).

At this time, it is assigned 9 bits for R-H, 9 bits for G-h, 9 bits for B-H, 12 bits for R-V, 12 bits for G-V and 12 bits for B-V in a single seed data, from which 63 bits in total are assigned, so that 1575 bits (25 seed points×63 bits) are assigned for a single screen, for which the memory 10 needs to use a ROM for 1575 bits. Other types of memories, such as an EEPROM, can alternatively be used.

On the other hand, the seed data interpolating part 21 of the convergence correcting part 20 interpolates seed data of 5(H)×5(V) stored at the memory 10, so as to obtain 90 points of sampling data (16 sampling points)×5(V), as shown in FIG. 4(D). In this respect, t (FIG. 4(D)) denotes a line interval, which is 64 lines in the case of an NTSC broadcasting system, while 77 lines in the case of a PAL broadcasting system.

At this time, the seed data of 1H line is interpolated with data of the 16 sampling points of data, as shown in FIG. 4(B). Thus, the interval(z) (FIG. 4(D)) between each single sampling point is calculated such that 63.5 µs÷16 points≈4 µs.

As shown in FIG. 4(D), the interpolated sampling data is temporarily stored by the latching part 22.

The sampling data interpolating part 23 interpolates y axis block (y1, y2, y3, y4 and y5 corresponding to x1 in FIG. 4(D)) for the 16 points of sampling data temporarily stored at the latching part 22 into 240H lines in the NTSC system, and 312H lines in the PAL system. At this time, the y axis block (y1, y2, y3, y4 and y5) of 16 points per 1H period is interpolated with 4 µs interval.

That is, since the interval(z) for a single sampling point is 4 µs, 2 µs is required for an operation and output of R-H, G-H, B-H, and 2 µs is required for an operation and outputting of R-V, G-V and B-V.

At this time, if a basic oscillation frequency is made to be 512fH (that is, 512×63.5 µs≈8 MHz=125 ns), R, G and B interpolation can be performed for the horizontal/vertical directions by 32 clocks in total.

A process for interpolating the seed data and sampling data in the convergence correcting part 20 will now be explained in detail hereinbelow.

Provided that 5 points of the surface of the non-spherical CRT are determined as seed data, as shown in FIG. 5(B), $P_{0,4}(x)$: interpolation interval $$P_{0,4}(x) = w0L0(x) + w1L1(x) + w2L2(x) + w3L3(x) + w4L4(x); \quad (1)$$

$$= w0 \cdot \frac{(x-x1)(x-x2)(x-x3)(x-x4)}{(x0-x1)(x0-x2)(x0-x3)(x0-x4)} + \quad (2)$$

$$w1 \cdot \frac{(x-x0)(x-x2)(x-x3)(x-x4)}{(x1-x0)(x1-x2)(x1-x3)(x1-x4)} +$$

$$w2 \cdot \frac{(x-x0)(x-x1)(x-x3)(x-x4)}{(x2-x0)(x2-x1)(x2-x3)(x2-x4)} +$$

$$w3 \cdot \frac{(x-x0)(x-x1)(x-x2)(x-x4)}{(x3-x0)(x3-x1)(x3-x2)(x3-x4)} +$$

$$w4 \cdot \frac{(x-x0)(x-x1)(x-x2)(x-x3)}{(x4-x0)(x4-x1)(x4-x2)(x4-x3)}$$

In the above formula (2), if values of the 5 points of seed data are given from P0 to P4, the intervening values are most linearly interpolated by making the 5 points as a pole.

The formula (2) is again expressed by using variables Wa, Wb, Wc, Wd, and We as follows.

$$Wa = (w0 - (4w1) + (6w2) - (4w3) + w4)x^4$$

$$Wb = ((-10tw0) + (36tw1) - (48tw2) + (28tw3) - (6tw4))x^3$$

$$Wc = ((35t^2w0) - (104t^2w1) + (114t^2w2) - (56t^2w3) + (11t^2w4))x^2$$

$$Wd = ((-50t^3w0) + (96t^3w1) - (72t^3w2) + (32t^3w3) - (6t^3w4))x$$

$$We = 24t^4w0$$

$$P_{0,4}(x) = (Wa + Wb + Wc + Wd + We)/(24t^4) \quad (3)$$

Here, w0–w4 are five points of seed data, and with respect to "t", 64 in the case of the NTSC system or 76 in the case of the PAL system is substituted, respectively, while with respect to "x", 0–263 in the case of the NTSC system or 0–312 in the case of the PAL system is substituted.

Therefore, the above formula (3) can be accomplished by a single chip, so that the convergence correcting part 20 is realized by a chip, and a real time convergence can be corrected using this chip.

The above formula (3) is carried out regardless of a broadcasting system. That is, if the broadcasting system is the NTSC system, 64 will be substituted for the t value and 263 will be substituted for the x value, while if it is the PAL system, 76 will be substituted for the t value and 312 will be substituted for the x value. Regarding HD TV or ED TV, it is necessary only to change the x and t values, so that it is applicable to a multi-scan. Consequently, it is not necessary for the convergence correction to be performed separately depending on the specific broadcasting system (NTSC/PAL), and therefore the correcting time can be reduced.

When the interpolation is completed for the vertical direction at the sampling data interpolating part 23, data for a single screen where the convergence is completely accorded is input to the digital/analog converter 30 so as to be converted into an analog data. The output from the digital/analog converter 30 is passed through the low band of the low-pass filter 40, and then is amplified at the amplifying part 50, so as to be displayed on the CRT.

This invention is most valuably applicable for projection television which uses CRT's for R, G and B, separately.

As mentioned, the digital convergence correcting circuit of the present invention includes a memory for storing only the seed data, and the convergence correcting part for interpolating and latching the seed data with 16 points of sampling data and then interpolating the latched sampling data in vertical direction with as many horizontal lines as is necessary according to the broadcasting system, since only the seed data is stored at the memory, the size of the memory is minimized compared to the conventional system. Moreover, in the case where the display mechanism accommodates a plurality of broadcasting systems, the convergence correction is made possible by only the seed data stored at a single memory, so that it will not be necessary to separately perform each convergence correction according to each broadcasting system, thereby reducing the correcting time and associated costs.

In addition, in the past, data was read using a central processing unit, and the speed was slow and it was hard to adjust to a real time, but, with the present invention, the convergence correcting part is realized by a single chip by using a Lagrange equation, so that real time convergence correction is made possible. That is, in the case in which a display mechanism accommodates a plurality of broadcasting systems, a convergence correction is possible by employing only the seed data stored at a single memory by changing the number in accordance with the broadcasting system, so that it will not be necessary to equip memories as required in accordance with broadcasting systems. As a result, the correcting time and the attendant cost incurred can be reduced. In addition, according to the present invention, the convergence correcting part is realized by a single chip by using a Lagrange equation, so that the real time convergence correction is possible.

What is claimed is:

1. A method for correcting digital convergence data of a display signal for displaying a plurality of points on a display screen, comprising the steps of:

storing in a memory only a predetermined number of the points of the screen as seed data, the predetermined number of points being less than all of the points of the screen;

interpolating the seed data to generate sample data along a horizontal line of the display signal, based on a predetermined equation for performing an interpolation operation;

interpolating the sample data in a vertical direction, based on said predetermined equation, wherein said predetermined equation operates on a plurality of display signal formats, wherein said predetermined equation is used to perform the same interpolation operation for all said seed data.

2. A method for correcting digital convergence data of a display signal for displaying a plurality of points on a display screen, comprising the steps of:

storing in a memory only a predetermined number of the points of the screen as seed data, the predetermined number of points being less than all of the points of the screen;

interpolating the seed data to generate sample data along a horizontal line of the display signal;

interpolating the sample data in a vertical direction, based on a predetermined equation, wherein said predetermined equation operates on a plurality of display signal formats, wherein said predetermined equation satisfies the following formulae, that is, $$Wa = (w0 - (4w1) + (6w2) - (4w3) + w4)x^4$$

$$Wb = ((-10tw0) + (36tw1) - (48tw2) + (28tw3) - (6tw4))x^3$$

$$Wc = ((35t^2w0) - (104t^2w1) + (114t^2w2) - (56t^2w3) + (11t^2w4))x^2$$

$$Wd = ((-50t^3w0) + (96t^3w1) - (72t^3w2) + (32t^3w3) - (6t^3w4))x$$

$$We = 24t^4w0$$

$P0,4(x)=(Wa+Wb+Wc+Wd+We)/(24t^4)$ wherein, P0,4(x) is an interpolating interval, w0–w4 are seed data points, t is a line interval according to a broadcasting system, and x is the total number of horizontal lines according to the broadcasting system.

3. In a digital convergence correcting circuit for converting convergence-corrected data into analog data and displaying the analog data on a cathode ray tube (CRT), the digital convergence correcting circuit comprising:

a memory unit for setting only predetermined points of a screen as seed data and storing only the seed data, the predetermined points being less than all of the points of the screen; and a convergence correcting unit for interpolating in a horizontal direction a predetermined number of sampling data from the seed data stored in the memory unit by using a predetermined equation for performing an interpolation process, latching the predetermined number of sampling data, and interpolating the predetermined number of latched sampling data in a vertical direction by using the predetermined equation, wherein the predetermined equation is used to preform the same interpolation operation on all the seed data.

4. The circuit according to claim 3, wherein said convergence correcting unit comprises a single chip which performs the predetermined equation.

5. The circuit according to claim 3, wherein said memory unit comprises a memory device which stores 1575 bits of information.

6. The circuit according to claim 5, wherein said memory device is a ROM.

7. The circuit according to claim 5, wherein said memory device is an EEPROM.

8. The circuit according to claim 3, further comprises a digital-to-analog (D/A) converter coupled to receive an output of said convergence correcting unit.

9. The circuit according to claim 8, further comprising a low pass filter coupled to receive an analog output of said D/A converter.

10. The circuit according to claim 9, further comprising a CRT for receiving an amplified output of said low pass filter.

11. The circuit according to claim 3, wherein there are sixteen points of sampling data.

12. In a digital convergence correcting circuit for converting convergence-corrected data into analog data and displaying the analog data on a cathode ray tube (CRT), the digital convergence correcting circuit comprising:

a memory unit for setting only predetermined points of a screen as seed data and storing only the seed data, the predetermined points being less than all of the points of the screen; and a convergence correcting unit for interpolating in a horizontal direction a predetermined number of sampling data from the seed data stored in the memory unit, latching the predetermined number of sampling data by using a predetermined equation, and interpolating the predetermined number of latched sampling data in a vertical direction by using the predetermined equation, wherein said predetermined equation satisfies the following formulae, $Wa=(w0-(4w1)+(6w2)-(4w3)+w4)x^4$ $Wb=((-10tw0)+(36tw1)-(48tw2)+(28tw3)-(6tw4))x^3$ $Wc=((35t^2w0)-(104t^2w1)+(114t^2w2)-(56t^2w3)+(11t^2w4))x^2$ $Wd=((-50t^3w0)+(96t^3w1)-(72t^3w2)+(32t^3w3)-(6t^3w4))x$ $We=24t^4w0$ $P0,4(x)=(Wa+Wb+Wc+Wd+We)/(24t^4)$ wherein, P0,4(x) is an interpolating interval, w0–w4 are seed data points, t is a line interval according to a broadcasting system, and x is the total number of horizontal lines according to the broadcasting system.

13. The circuit according to claim 12, wherein said convergence correcting unit comprises a single chip which performs the predetermined equation.

* * * * *